United States Patent
Chang et al.

(10) Patent No.: US 10,494,023 B2
(45) Date of Patent: Dec. 3, 2019

(54) SYSTEM AND METHOD FOR PERFORMING PARALLEL PARKING MANEUVERS WITH SINGLE SIDE BRAKING

(71) Applicant: Robert Bosch GmbH, Stuttgart (DE)

(72) Inventors: Fu-Long Chang, Ann Arbor, MI (US); Jin-Gen Wu, Ann Arbor, MI (US); Ravikumar Bhadange, Farmington, MI (US)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 15/607,790

(22) Filed: May 30, 2017

(65) Prior Publication Data
US 2018/0346028 A1 Dec. 6, 2018

(51) Int. Cl.
*B62D 15/02* (2006.01)
*B60W 10/04* (2006.01)
*B60W 10/18* (2012.01)
*B60W 10/20* (2006.01)
*G08G 1/14* (2006.01)

(52) U.S. Cl.
CPC ......... *B62D 15/0285* (2013.01); *B60W 10/04* (2013.01); *B60W 10/18* (2013.01); *B60W 10/20* (2013.01); *G08G 1/14* (2013.01)

(58) Field of Classification Search
CPC .............. B62D 15/0285; B62D 15/027; B62D 15/0275; B62D 15/028; A01B 69/008
See application file for complete search history.

(56) References Cited

U.S. PATENT DOCUMENTS

| | | |
|---|---|---|
| 6,659,245 B1 | 12/2003 | Lee |
| 7,070,247 B2 | 7/2006 | Offerle |
| 7,318,629 B1 | 1/2008 | Sun et al. |
| 7,529,600 B2 | 5/2009 | Mori et al. |
| 7,712,845 B2 | 5/2010 | Mackovjak et al. |

(Continued)

FOREIGN PATENT DOCUMENTS

| | | | |
|---|---|---|---|
| DE | 102009026915 A1 * | 12/2010 | ............... B60K 6/46 |
| DE | 102009026915 A1 | 12/2010 | |
| WO | 2014001067 A1 | 1/2014 | |

OTHER PUBLICATIONS

Extended European Search Report from the European Patent Office for Application No. 18165076.3 dated Oct. 15, 2018 (10 pages).

(Continued)

*Primary Examiner* — Faye M Fleming
(74) *Attorney, Agent, or Firm* — Michael Best & Friedrich LLP

(57) ABSTRACT

Systems and methods for performing a parallel parking maneuver of a host vehicle between a first object and a second object. In one embodiment, the method includes detecting a parking mode and determining a parking space size upon detecting the parking mode. The method also includes selecting a left rear wheel of the host vehicle or a right rear wheel of the host vehicle. The method further includes applying a first braking force, sufficient to lock-up the selected rear wheel of the host vehicle, to the selected rear wheel of the host vehicle when the parking space size is less than a size threshold. The method also includes applying a second braking force to the selected rear wheel of the host vehicle when the parking space size is greater than or equal to the size threshold. The second braking force is less than the first braking force.

19 Claims, 9 Drawing Sheets

(56) References Cited

U.S. PATENT DOCUMENTS

| | | |
|---|---|---|
| 8,380,416 B2 | 2/2013 | Offerle et al. |
| 9,475,492 B2 * | 10/2016 | Okano .................... H04N 7/18 |
| 9,637,117 B1 * | 5/2017 | Gusikhin .............. B60W 30/06 |
| 2012/0072067 A1 * | 3/2012 | Jecker ................ B62D 15/0285 |
| | | 701/25 |
| 2014/0005904 A1 | 1/2014 | Chong et al. |
| 2016/0257304 A1 * | 9/2016 | Lavoie .................. B60W 30/06 |

OTHER PUBLICATIONS

Vorobieva et al., "Automatic parallel parking in tiny spots: path planning and control," IEEE Trans. Intell. Transp. Syst., 2015, 16, (1), 396-410.

Paromtchik et al., "Autonomous Parallel Parking of a Nonholonomic Vehicle," Proc. of the IEEE Intelligent Vehicles Simp., 1996, (6 pages).

* cited by examiner

SYSTEM AND METHOD FOR PERFORMING PARALLEL PARKING MANEUVERS WITH SINGLE SIDE BRAKING

BACKGROUND

Parallel parking is a difficult vehicle maneuver to perform. Automated parking aid systems included in current vehicles assist drivers by automatically adjusting the steering direction of vehicles while performing parallel parking maneuvers. However, even with these conventional parking aid systems, multiple turns are often required when parallel parking into a smaller size parking space.

SUMMARY

One embodiment provides a method of performing a parallel parking maneuver of a host vehicle between a first object and a second object. The method includes detecting a parking mode and determining a parking space size upon detecting the parking mode. The method further includes selecting a left rear wheel of the host vehicle or a right rear wheel of the host vehicle. The method also includes applying a first braking force, sufficient to lock-up the selected rear wheel of the host vehicle, to the selected rear wheel when the parking space size is less than a size threshold. The method further includes applying a second braking force to the selected rear wheel of the host vehicle when the parking space size is greater than or equal to the size threshold. The second braking force is less than the first braking force.

Another embodiment provides a method of performing a parallel parking maneuver of a host vehicle between a first object and a second object. The method includes detecting a parking mode and determining a vehicle speed upon detecting the parking mode. The method further includes selecting a left rear wheel of the host vehicle or a right rear wheel of the host vehicle. The method also includes applying a braking force to the selected rear wheel of the host vehicle when the vehicle speed is greater than a speed threshold.

Yet another embodiment provides a system for performing a parallel parking maneuver of a host vehicle between a first object and a second object. In one embodiment, the system includes a powertrain, a braking system, a steering system, and an electronic controller. The electronic controller is electrically coupled to the powertrain, the braking system, and the steering system. The electronic controller is configured to detect a parking mode and determine a parking space size upon detecting the parking mode. The electronic controller is also configured to select a left rear wheel of the host vehicle or a right rear wheel of the host vehicle. The electronic controller is further configured to apply, via the braking system, spin-by-lockup-wheel to the selected rear wheel when the parking space size is less than a size threshold. The electronic controller is also configured to apply, via the braking system, steer-by-brake to the selected rear wheel when the parking space size is greater than or equal to the size threshold.

Other aspects and embodiments will become apparent by consideration of the detailed description and accompanying drawings.

Figure 1:
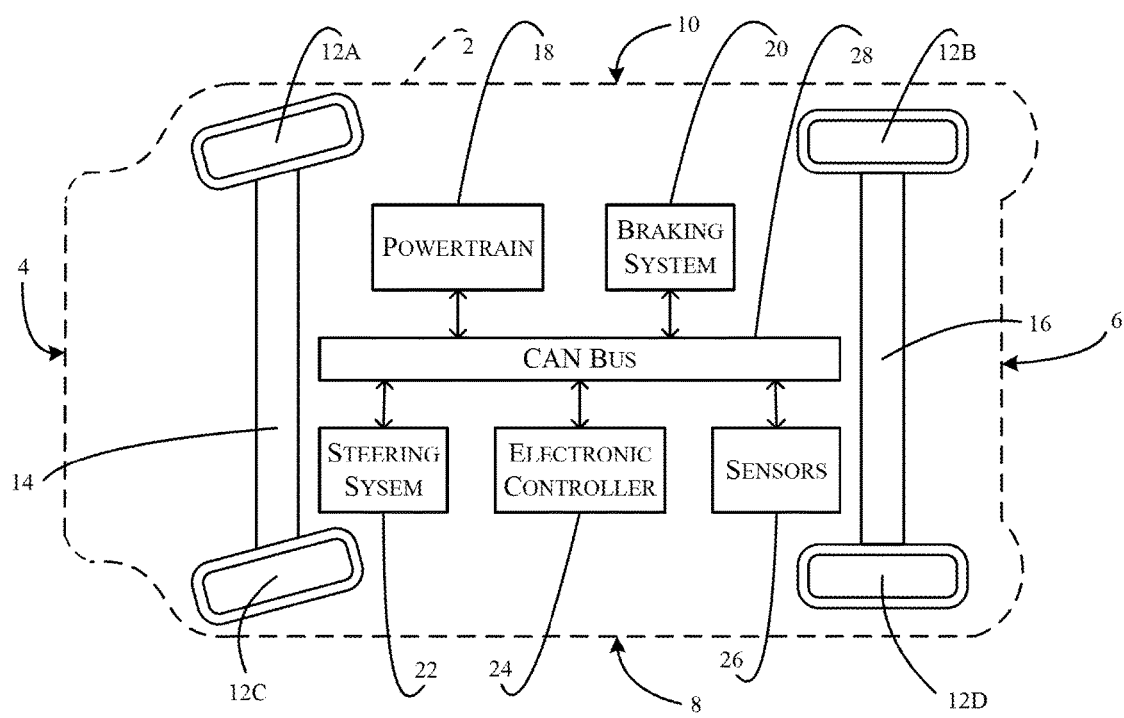
FIG. 1 is a diagram of a host vehicle, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding various embodiments so as not to obscure the disclosure with details that will be readily apparent to those of ordinary skill in the art having the benefit of the description herein.

DETAILED DESCRIPTION

Before any embodiments are explained in detail, it is to be understood that no embodiment is necessarily limited in its application to the details of construction and the arrangement of components set forth in the following description or illustrated in the following drawings. Other embodiments are possible and embodiments described are capable of being practiced or of being carried out in various ways.

It should also be noted that a plurality of different structural components may be utilized to implement the disclosure. Furthermore, and as described in subsequent paragraphs, the specific configurations illustrated in the drawings are intended to exemplify certain embodiments. Alternative configurations are possible.

For ease of description, the example systems presented herein may be illustrated with a single exemplar of each of their component parts. Some examples may not describe or illustrate all components of the systems. Other example embodiments may include more or fewer of each of the illustrated components, may combine some components, or may include additional or alternative components.

FIG. 1 is a diagram of one example embodiment of a host vehicle 2 having a front side 4, a rear side 6, a left side 8, and a right side 10. The host vehicle 2 includes four wheels 12A, 12B, 12C, and 12D. The front wheels 12A and 12C are connected to a front axle 14. The rear wheels 12B and 12D are connected to a rear axle 16. The host vehicle 2 also includes a powertrain 18, a braking system 20, a steering system 22, an electronic controller 24, and a plurality of sensors 26. The powertrain 18, the braking system 20, the steering system 22, the electronic controller 24, and the plurality of sensors 26 are coupled via a controller area network (CAN) bus 28.

Figure 2:
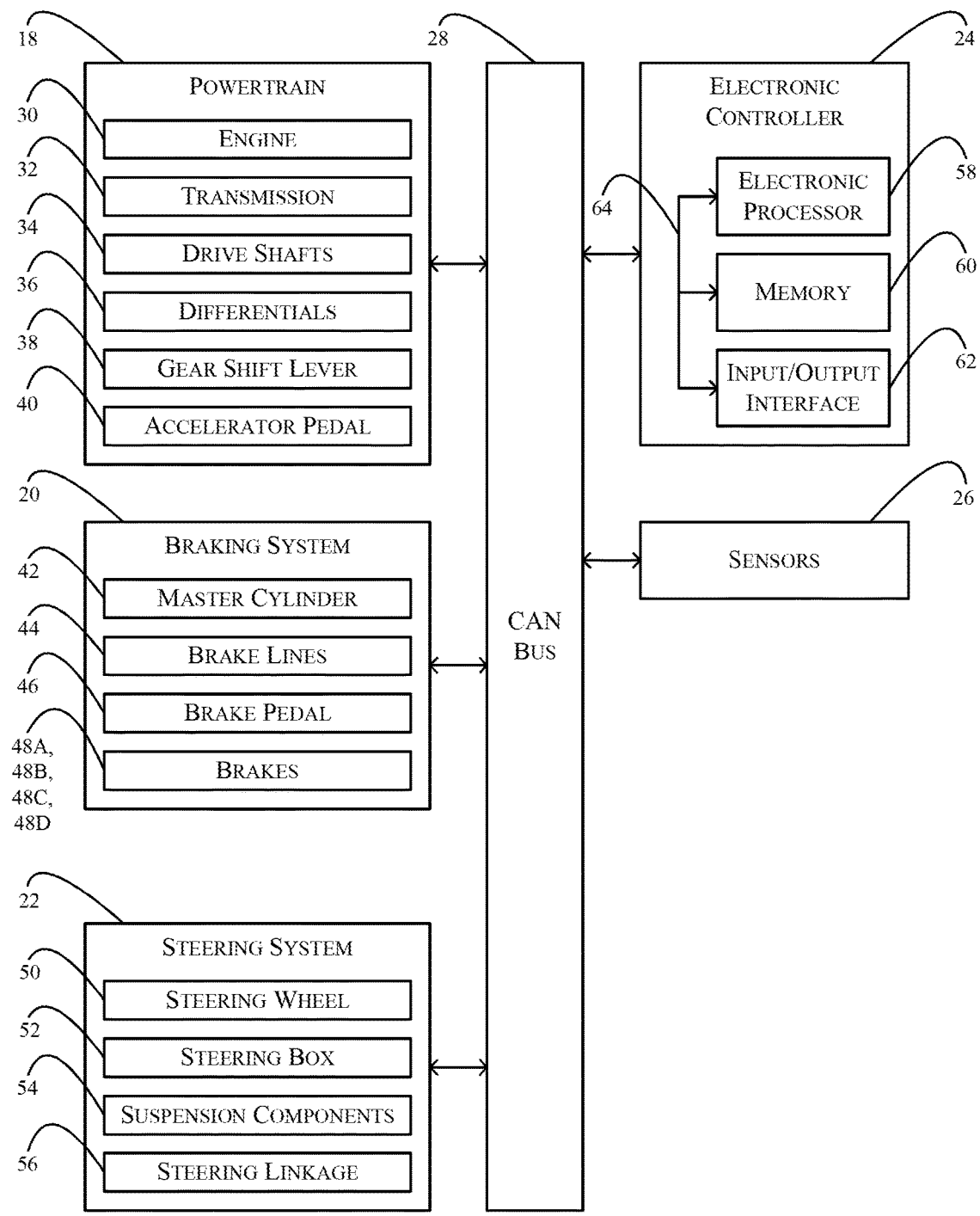
FIG. 2 is a diagram of various components included in the host vehicle of FIG. 1, in accordance with some embodiments.

As illustrated in FIG. 2, the powertrain 18 includes, for example, an engine 30, a transmission 32, drive shafts 34, differentials 36, a gear shift lever 38, an accelerator pedal 40, and other components that generate and deliver driving power to the wheels 12A, 12B, 12C, and 12D. In some embodiments, the powertrain 18 independently delivers driving power to the wheels 12A, 12B, 12C, and 12D. For example, the powertrain 18 simultaneously delivers different driving forces to the right rear wheel 12B and the left rear wheel 12D.

The braking system 20 includes, for example, a master cylinder 42, brakes lines 44, a brake pedal 46, and brakes 48A, 48B, 48C, and 48D for each of the wheels 12A, 12B, 12C, and 12D (such as disc brakes or drum brakes). In some embodiments, the brakes 48A, 48B, 48C, and 48D are hydraulically-actuated. In other embodiments, the brakes 48A, 48B, 48C, and 48D are electrically-actuated.

The steering system 22 includes, for example, a steering wheel 50, a steering box 52, suspension components 54, and steering linkage 56. The steering box 52 connects to the steering wheel 50. The suspension components 54 pivot the front wheels 12A and 12C. The steering linkage 56 connects the steering wheel 50 to the front wheels 12A and 12C.

In one example, the electronic controller 24 includes, among other things, an electronic processor 58 (for example, a microprocessor), memory 60, and an input/output interface 62. The electronic processor 58, the memory 60, the input/output interface 62, as well as other various modules (not shown) are coupled via a bus 64, or are coupled directly, by one or more additional control or data buses, or a combination thereof. The memory 60 includes, for example, read only memory (ROM), random access memory (RAM), an electrically erasable programmable read-only memory (EEPROM), other non-transitory computer-readable media, or a combination thereof. The electronic processor 58 is configured to retrieve program instructions and data from the memory 60 and execute, among other things, instructions to perform the methods described herein. Additionally or alternatively, the memory 60 is included in the electronic processor 58. The input/output interface 62 includes routines for transferring information between components within the electronic controller 24 and other components of the host vehicle 2.

The plurality of sensors 26 include sensors to detect various conditions of the host vehicle 2 (for example, wheel speed sensors, wheel direction sensors, steering angle sensors, yaw rate sensors, lateral acceleration sensors, body slip angle sensors, engine torque sensors, or a combination thereof). In some embodiments, the plurality of sensors 26 also include sensors to detect the presence, position, and distance of objects located around the host vehicle 2 (for example, radar sensors, optical sensors, LIDAR sensors, ultrasonic sensors, optical sensors, or a combination thereof).

Vehicles, such as the host vehicle 2, often require multiple turns when parallel parking into a smaller size parking space. The minimum size parallel parking space that the host vehicle 2 can parallel park into is related to the turning radius of the host vehicle 2 (i.e., the radius of the smallest circular turn that the host vehicle 2 is capable of making). The turning radius of the host vehicle 2 can be decreased (i.e., improved) by applying single side braking. Single side braking includes applying a braking force to one or more wheels on one side of the host vehicle 2. Two different single side braking strategies to decrease the turning radius of the host vehicle 2 while performing a parallel parking maneuver are described below.

Figure 3A:
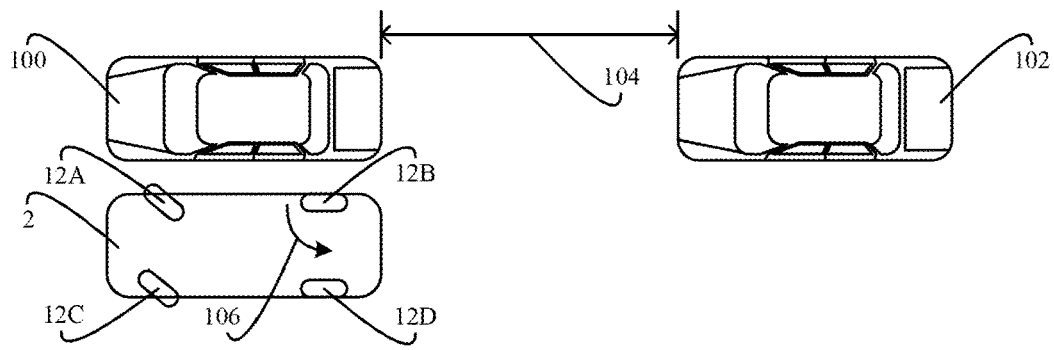
FIGS. 3A-3D are diagrams of a parallel parking maneuver including spin-by-lockup-wheel, in accordance with some embodiments.

FIGS. 3A-3D illustrate an example parallel parking maneuver including single side braking with spin-by-lockup-wheel. In FIG. 3A, the host vehicle 2 is positioned to perform a parallel parking maneuver between a first object and a second object (for example, between a first vehicle 100 and a second vehicle 102). The distance 104 between the first vehicle 100 and the second vehicle 102 is less than a size threshold (for example, less than 1.5 times the length of the host vehicle 2). The front wheels 12A and 12C are positioned toward the right side 10 of the host vehicle 2. The braking system 20 of the host vehicle 2 applies a braking force to the right rear wheel 12B (for example, via brake 48B) such that the right rear wheel 12B locks up. In other words, the braking system 20 applies a braking force that prevents the right rear wheel 12B from rotating about the rear axle 16 of the host vehicle 2. While the braking force is applied to the right rear wheel 12B, the powertrain 18 of the host vehicle 2 applies a driving force to the front wheels 12A and 12C such that the host vehicle 2 spins about the right rear wheel 12B (for example, in the direction of arrow 106). In some embodiments, the powertrain 18 of the host vehicle 2 also applies a driving force to the left rear wheel 12D.

Figure 3B:
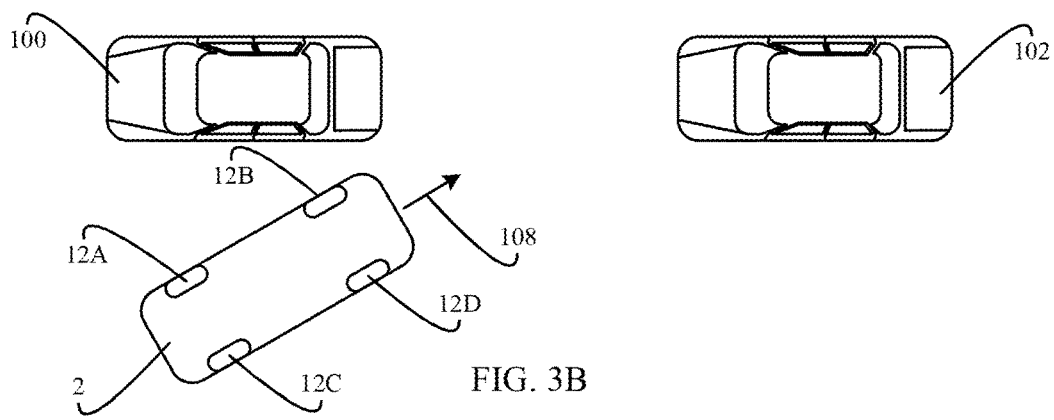

The host vehicle 2 spins about the right rear wheel 12B until the steering angles of front wheels 12A and 12C are adjusted. For example, when the steering angles of the front wheels 12A and 12C are adjusted such that the front wheels 12A and 12C point toward the front side 4 of the host vehicle 2, as illustrated in FIG. 3B, the driving force continues to be applied to the front wheels 12A and 12C, but the braking force applied to the right rear wheel 12B is terminated such that the host vehicle 2 moves substantially straight in a rearward direction (for example, in the direction of arrow 108).

Figure 3C:
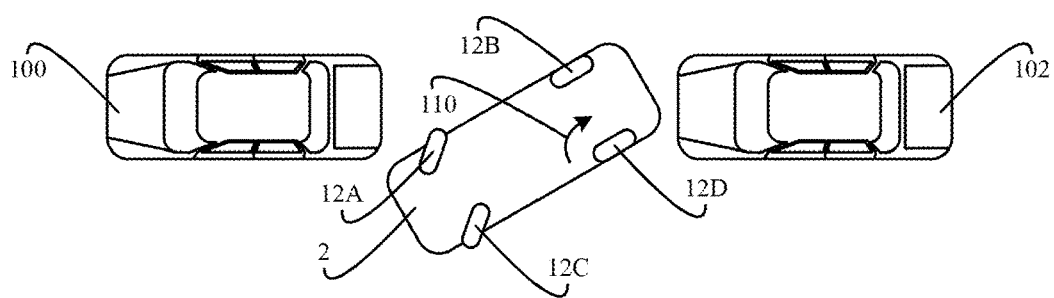

When the steering angles of the front wheels 12A and 12C are adjusted such that the front wheels 12A and 12C point toward the left side 8 of the host vehicle 2, as illustrated in FIG. 3C, the braking system 20 of the host vehicle 2 applies a braking force to the rear left wheel 12D (for example, via brake 48D) such that the left rear wheel 12D locks up. Simultaneously, the powertrain 18 of the host vehicle 2 continues to apply a driving force to the front wheels 12A and 12C such that the host vehicle 2 spins about the left rear wheel 12D (for example, in the direction of arrow 110).

Figure 3D:
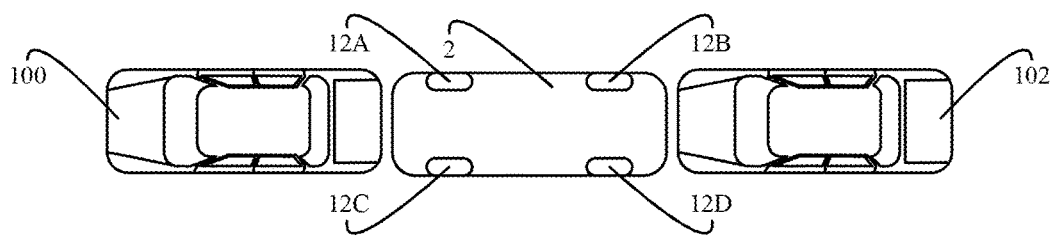

The host vehicle 2 spins about the left rear wheel 12D until the host vehicle 2 is positioned within the parking space, as illustrated in FIG. 3D. With this parallel parking maneuver, the minimum parking space size is substantially equal to the diagonal length of the host vehicle 2.

Figure 4A:
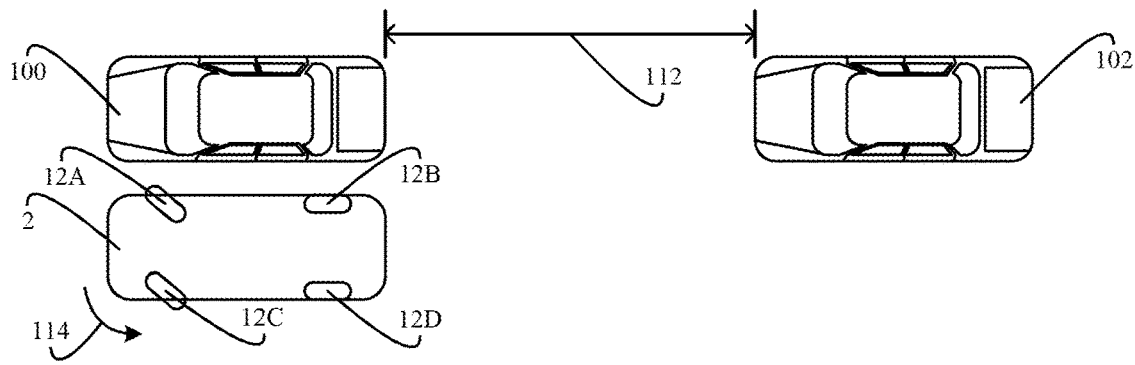
FIGS. 4A-4D are diagrams of a parallel parking maneuver including steer-by-brake, in accordance with some embodiments.

FIGS. 4A-4D illustrate an example parallel parking maneuver including single side braking with steer-by-brake. In FIG. 4A, the distance 112 between the first vehicle 100 and the second vehicle 102 is greater than the distance 104 in FIG. 3A and greater than or equal to a size threshold. For example, the distance 112 is about 1.5 times the length of the host vehicle 2. The front wheels 12A and 12C are positioned toward the right side 10 of the host vehicle 2. The braking system 20 of the host vehicle 2 applies a braking force to the right rear wheel 12B and the powertrain 18 of the host vehicle 2 applies a driving force to the front wheels 12A and 12C such that the host vehicle 2 moves in a rearward direction while turning into the parallel parking space (for example, in the direction of arrow 114). The braking force applied to the right rear wheel 12B in FIG. 4A is less than the braking force applied in FIG. 3A. In other words, the braking force applied in FIG. 4A decreases the turning radius of the host vehicle 2 while still allowing the host vehicle 2 to move in a rearward direction. In some embodiments, the powertrain 18 of the host vehicle 2 also applies a driving force to the left rear wheel 12D.

Figure 4B:
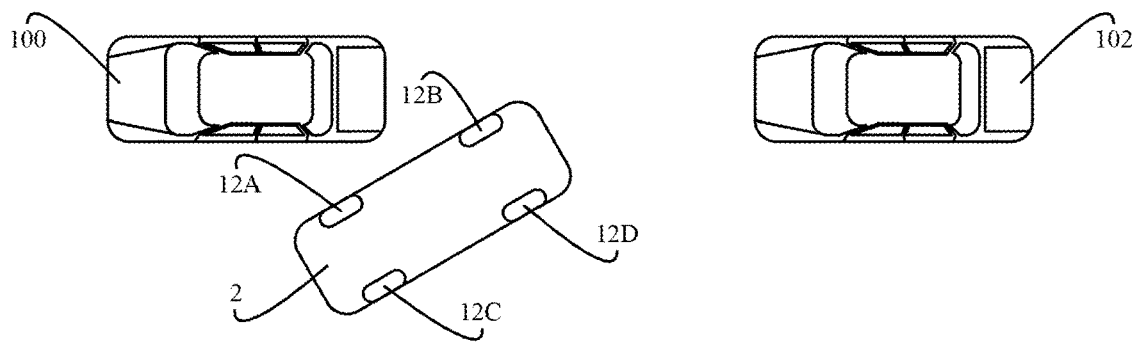

The braking system 20 continues to apply the braking force to the right rear wheel 12B until the steering angles of the front wheels 12A and 12C are adjusted. For example, when the steering angles of the front wheels 12A and 12C are adjusted such that the front wheels 12A and 12C point toward the front side 4 of the host vehicle 2, as illustrated in FIG. 4B, the driving force continues to be applied to the front wheels 12A and 12C, but the braking force applied to the right rear wheel 12B is terminated.

Figure 4C:
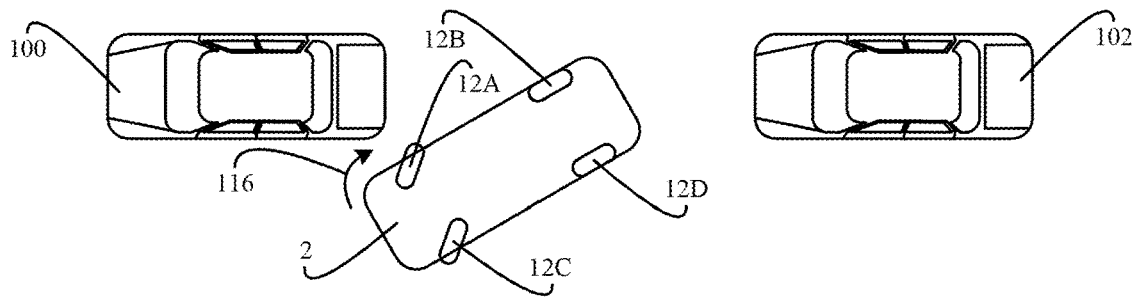

When the steering angles of the front wheels 12A and 12C are adjusted such that the front wheels 12A and 12C point toward the left side 8 of the host vehicle 2, as illustrated in FIG. 4C, the braking system 20 applies a braking force to the left rear wheel 12D and the powertrain 18 applies a driving force to the front wheels 12A and 12C. The braking force applied to the left rear wheel 12D in FIG. 4C is less than the braking force applied in FIG. 3C. The host vehicle 2 moves in a rearward direction while turning into the parallel parking space (for example, in the direction of arrow 116).

Figure 4D:
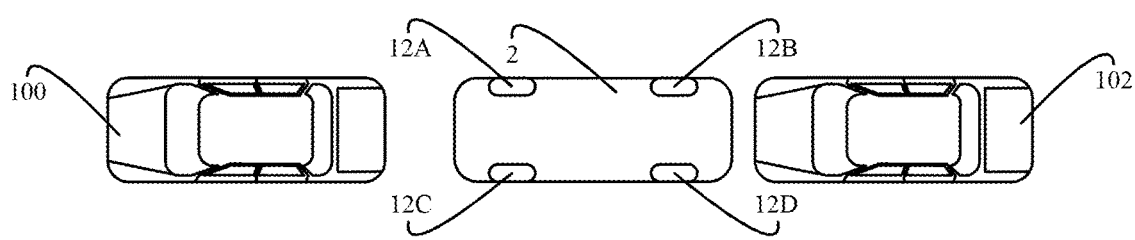

The host vehicle 2 continues backing into the parallel parking space until the host vehicle 2 is positioned within the parking space, as illustrated in FIG. 4D. With this parallel parking maneuver, the minimum parking space size is larger than the size needed for steer-by-lock-up-wheel, but still smaller than the size needed for a steering only maneuver.

Figure 5:
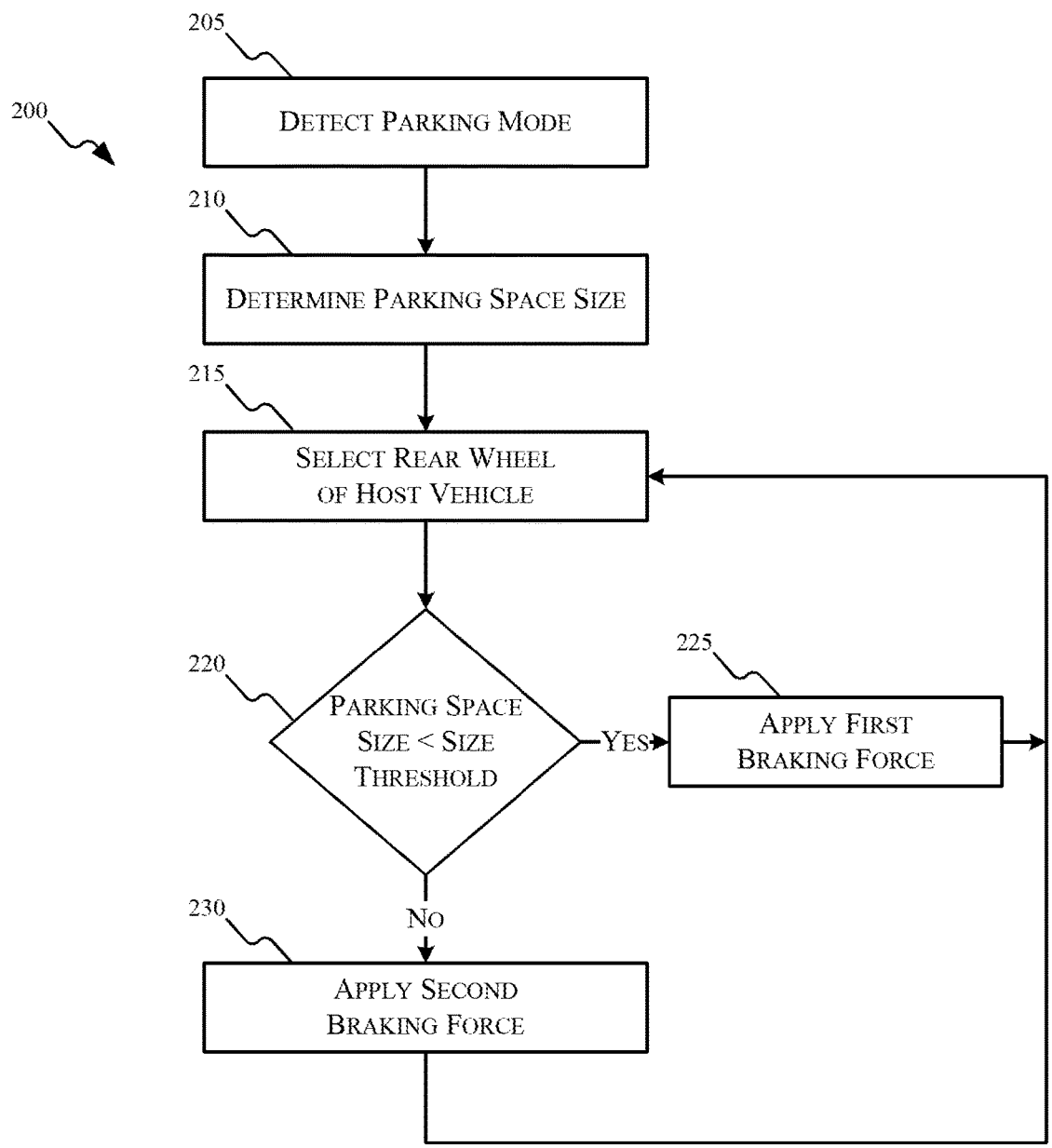
FIG. 5 is a flowchart of a method of performing a parallel parking maneuver based on the size of a parking space, in accordance with some embodiments.

FIG. 5 is an example method 200 of performing a parallel parking maneuver with the host vehicle 2. At block 205, the electronic controller 24 detects a parking mode. In some embodiments, the electronic controller 24 determines the parking mode using various combinations of the plurality of sensors 26 such as steering angle sensors, wheel speed sensors, wheel direction sensors, a combination of wheel speed sensors and steering angle sensors, a driver actuated switch, a driver selected button, the vehicle speed, or a switch included in the steering system 22.

At block 210, the electronic controller 24 determines a parking space size. The parking space size is, for example, the distance 104 between the first vehicle 100 and the second vehicle 102, as illustrated in FIG. 3A. In some embodiments, electronic controller 24 determines the parking space size using sensors included in the plurality of sensors 26 such as radar sensors, LIDAR sensors, ultrasonic sensors, optical sensors, or a combination thereof. For example, the electronic controller 24 using ultrasonic sensors to detect the distance between the second vehicle 102 and the first vehicle 100 as the host vehicle 2 drives from a position next to the second vehicle 102 to a position next to the first vehicle 100 in order to perform a parallel parking maneuver.

At block 215, the electronic controller 24 selects a rear wheel of the host vehicle 2. In other words, the electronic controller 24 selects the inside wheel of the host vehicle 2 in order to determine which rear wheel to apply a braking force to. In some embodiments, the electronic controller 24 makes this selection based at least in part on a steering angle of the host vehicle 2, as described in more detail below.

At block 220, the electronic controller 24 determines whether the parking space size is less than a size threshold. For example, the electronic controller 24 determines whether the parking space size is less than 1.5 times the diagonal length of the host vehicle 2.

When the parking space size is less than the size threshold, the braking system 20 applies a first braking force to the selected rear wheel of the host vehicle 2 (at block 225). The first braking force is sufficient to lock up the selected rear wheel of the host vehicle 2 and apply spin-by-lockup-wheel. In other words, the first braking force is sufficient to lock-up the selected rear wheel and allow the host vehicle 2 to spin about the selected rear wheel. For example, the braking system 20 applies a braking force of about 15,000 Newtons to the selected rear wheel of the host vehicle 2.

Alternatively, when the parking space size is greater than or equal to the size threshold, the braking system 20 applies a second braking force to the selected rear wheel of the host vehicle 2 (at block 230). The second braking force is less than the first braking force. However, the second braking force is sufficient enough to apply steer-by-brake and decrease the turning radius of the host vehicle 2. For example, the braking system 20 applies a braking force of about 12,000 Newtons to the selected rear wheel of the host vehicle 2.

In some embodiments, after block 225 or block 230, the method 200 returns to block 215 to re-select the rear wheel of the host vehicle 2. Parallel parking maneuvers using spin-by-lockup-wheel and steer-by-brake include at least one change in the selected rear wheel. For example, the selected rear wheel starts as the right rear wheel 12B in a first portion of a parallel parking maneuver and changes to the left rear wheel 12D in a second portion of the parallel parking maneuver.

As discussed above, the electronic controller 24 determines whether the parking space size is less than a size threshold (at block 220). In some parallel parking situations, the size of the parallel parking space is too small and parallel parking is not possible using steering-by-brake or spin-by-lockup-wheel. Thus, in some embodiments, prior to block 220, the electronic controller 24 determines whether the parking space size is greater than a minimum parking space size. When the parking space size is greater than the minimum parking space size, the method 200 proceeds to block 220. Alternatively, when the parking space size is less than of equal to the minimum parking space size, the parallel parking maneuver is cancelled. In some embodiments, the electronic controller 24 generates an alert signal to indicate that the size of the parking space is too small for parallel parking.

In some parallel parking situations, the parallel parking space is large enough such that a parallel parking maneuver can be performed using steering only (i.e., without applying single side braking). Thus, in some embodiments, prior to block 220, the electronic controller 24 determines whether the parking space size is less than a second size threshold. The second size threshold is greater than the size threshold in block 220. When the parking space size is less than the second size threshold, the method 200 proceeds to block 220. Alternatively, when the parking space size is greater than or equal to the second size threshold, the electronic controller 24 performs the parallel parking maneuver with steering only.

The speed of the host vehicle 2 affects the turning radius. The turning radius of the host vehicle 2 increases as the vehicle speed increases. Thus, increasing the vehicle speed also increases the minimum parking space size. In addition to reducing the turning radius of the host vehicle 2 while performing parallel parking maneuvers, steer-by-brake can also be used to transfer linear momentum of the host vehicle 2 into yaw momentum. In other words, steer-by-brake can be used to increase parallel parking speed without sacrificing the ability to park in smaller size parking spaces.

Figure 6:
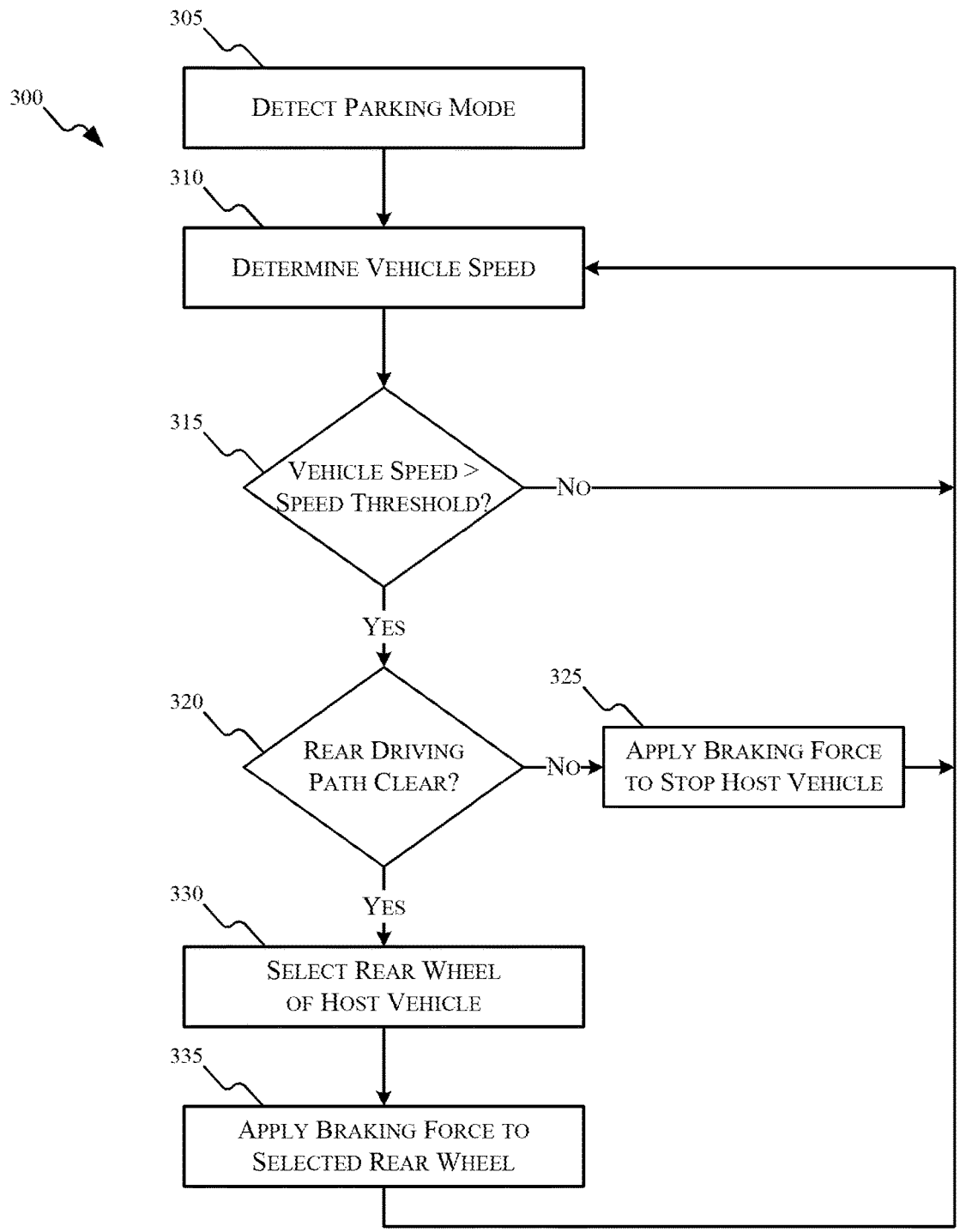
FIG. 6 is a flowchart of a method of limiting vehicle speed while performing a parallel parking maneuver, in accordance with some embodiments.

FIG. 6 is an example method 300 of performing a parallel parking maneuver with the host vehicle 2 using steer-by-brake to limit the vehicle speed. At block 305, the electronic controller 24 detects a parking mode. In some embodiments, the electronic controller 24 determines the parking mode using methods similar to those described above in relation to block 205 in FIG. 5.

At block 310, the electronic controller 24 determines the vehicle speed. In some embodiments, the electronic controller 24 determines the vehicles speed using various combinations of the plurality of sensors 26 such as wheel speed sensors, wheel direction sensors, lateral acceleration sensors, or a combination thereof.

At block 315, the electronic controller 24 determines whether the vehicle speed is greater than a speed threshold. For example, the electronic controller 24 determines whether the vehicle speed is greater than 3.1 miles per hour (or 5 kilometers per hour). When the vehicle speed is less than or equal to the speed threshold, the electronic controller 24 continues the parallel parking maneuver without performing a braking intervention and continues to monitor the vehicle speed (i.e., returns to block 310).

Figure 7:
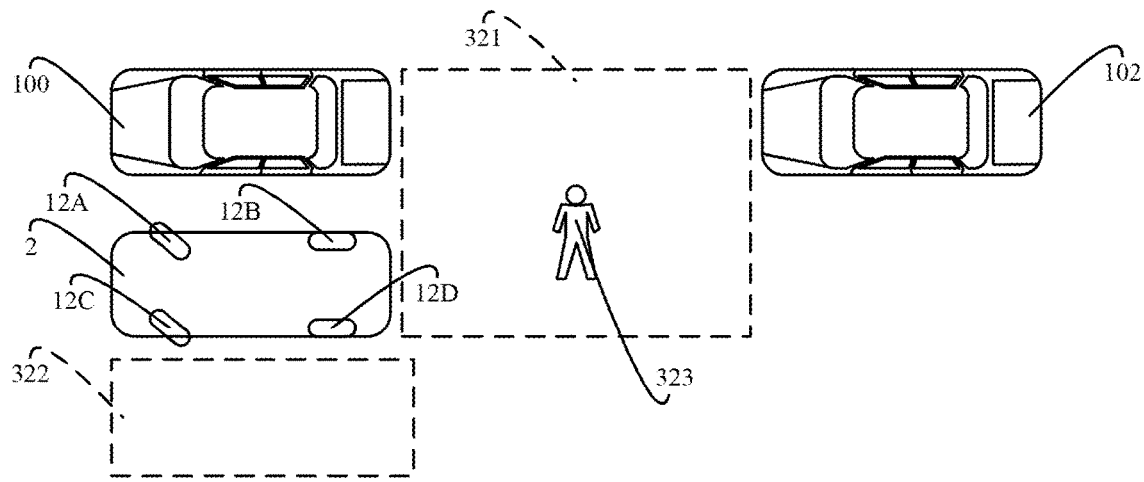
FIG. 7 is a diagram of a parallel parking situation in which a rear path of a host vehicle is obstructed by a pedestrian.
Figure 8:
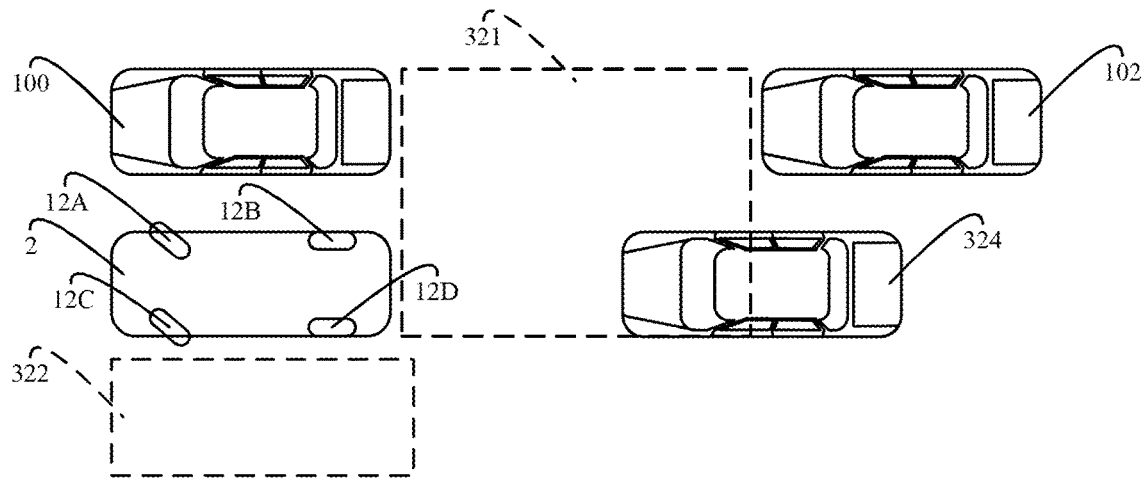
FIG. 8 is a diagram of a parallel parking situation in which a rear path of a host vehicle is obstructed by another vehicle.

Alternatively, when the vehicle speed is greater than the speed threshold, the electronic controller 24 determines whether a rear driving path is clear (at block 320). As illustrated in FIGS. 7 and 8, the rear driving path is a first area 321 between the rear side 6 of the host vehicle 2 and the second vehicle 102. In some parallel parking situations, the first area 321 is not clear (i.e., obstructed). For example, a pedestrian 323 may be standing in or walking through the first area 321, as illustrated in FIG. 7. As a further example, a third vehicle 324 may be located within the first area 321, as illustrated in FIG. 8. In some embodiments, the electronic controller 24 also determines whether a lateral driving path is clear. As illustrated in FIGS. 7 and 8, the lateral driving path is a second area 322 located adjacent to the left side 8 of the host vehicle 2.

Returning to FIG. 6, at block 320, electronic controller 24 determines whether the rear driving path is clear using sensors included in the plurality of sensors 26. For example, the electronic controller 24 detects objects in the rear driving path using radar sensors, LIDAR sensors, ultrasonic sensors, optical sensors, or a combination thereof. In some embodiments, the electronic controller 24 also determines whether a lateral driving path of the host vehicle 2 is clear.

When the rear driving path (or the lateral path) is not clear, the braking system 20 applies a braking force to stop (or slow down) movement of the host vehicle 2 (at block 325). In some embodiments, the braking system 20 applies a braking force to both rear wheels 12B and 12D to stop movement of the host vehicle 2. Alternatively or in addition, the braking system 20 applies a braking force to both front wheels 12A and 12C to stop movement of the host vehicle 2. In some embodiments, the method 300 returns to block 310 after block 325, as illustrated in FIG. 6.

Alternatively, when the rear driving path (and the lateral driving) is clear, the electronic controller 24 selects a rear wheel of the host vehicle 2 (at block 330). In other words, the electronic controller 24 selects the inside wheel of the host vehicle 2 in order to determine which rear wheel to apply a braking force to. In some embodiments, the electronic controller 24 makes this selection based at least in part on a steering angle of the host vehicle 2, as described in more detail below.

At block 335, the braking system 20 applies a braking force to the selected rear wheel of the host vehicle 2. The braking force converts the linear momentum of the host vehicle 2 into yaw momentum. In some embodiments, the electronic controller 24 determines the amount of braking force based at least in part on the vehicle speed, the parking space size, the deviation between a target and an actual position of the host vehicle 2, or a combination thereof. For example, the electronic controller 24 increases the amount of braking force applied by the braking system 20 as the vehicle speed increases. In some embodiments, the method 300 returns to block 310 after block 335, as illustrated in FIG. 6

Figure 9:
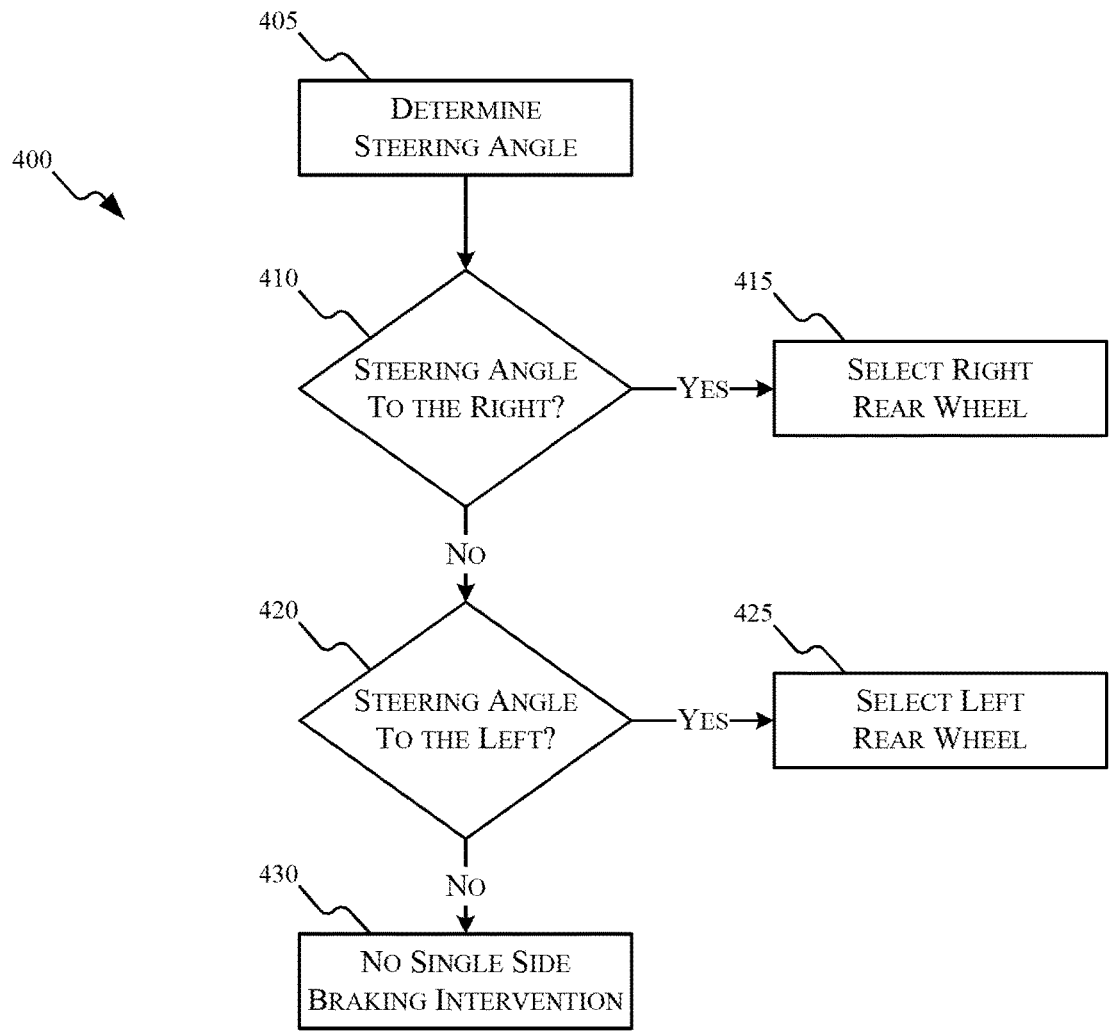
FIG. 9 is a flowchart of a method of selecting a rear wheel of a host vehicle in which to apply braking to, in accordance with some embodiments.

As described above, in some embodiments, the electronic controller 24 selects a rear wheel of the host vehicle 2 (i.e., the inside wheel) based at least in part a steering angle of the host vehicle 2. FIG. 9 is an example method 400 for selecting a rear wheel of the host vehicle 2 based on a steering angle of the host vehicle 2. At block 405, the electronic controller 24 determines a steering angle of the host vehicle 2.

In some embodiments, the steering angle includes a position of the steering wheel 50. The electronic controller 24 determines the position of the steering wheel 50 using one or more steering angle sensors included in the plurality of sensors 26. The electronic controller 24 determines the angle between the current position of the steering wheel 50 and a reference position (i.e., the position of the steering wheel 50 when the front wheels 12A and 12C are positioned straight forward). When the steering wheel 50 is positioned in the reference position, the electronic controller 24 determines that the steering angle is zero (or substantially zero). When the steering wheel 50 is positioned to a maximum counter-clockwise position (i.e., the front wheels 12A and 12C are positioned toward the left side 8 of the host vehicle 2), the electronic controller 24 determines that the steering angle is negative 540 degrees (or 540 degrees counter-clockwise). Alternatively, when the steering wheel 50 is positioned to a maximum clockwise position (i.e., the front wheels 12A and 12C are positioned toward the right side 10 of the host vehicle 2), the electronic controller 24 determines that the steering angle is positive 540 degrees (or 540 degrees clockwise).

Alternatively or in addition, the steering angle includes the positions of the front wheels 12A and 12C. The electronic controller 24 determines the positions of the front wheels 12A and 12C using one or more wheel direction sensors included in the plurality of sensors 26. The electronic controller 24 determines the angles between the current positions of the front wheels 12A and 12C and reference positions (i.e., positions when the front wheels 12A and 12C are straight forward). When front wheels 12A and 12C are positioned straight forward (i.e., in the reference position), the electronic controller 24 determines that the steering angle is zero (or substantially zero). When the front wheels 12A and 12C are positioned to a maximum counter-clockwise position (i.e., the front wheels 12A and 12C are positioned all the way toward the left side 8 of the host vehicle 2), the electronic controller 24 determines that the steering angle is negative 40 degrees (or 40 degrees counter-clockwise). Alternatively, when the front wheels 12A and 12C are positioned to a maximum clockwise position (i.e., the front wheels 12A and 12C are positioned all the way toward the right side 10 of the host vehicle 2), the electronic controller 24 determines that the steering angle is positive 40 degrees (or 40 degrees clockwise).

Return to FIG. 9, at block 410, the electronic controller 24 determines whether the steering angle is to the right. In some embodiments, the electronic controller 24 compares the steering angle to a first threshold value. For example, when the steering angle is the position of the steering wheel 50, the electronic controller 24 determines that the steering angle is to the right when the steering wheel position is greater than positive 180 degrees. As a further example, when the steering angle is the positions of the front wheels 12A and 12C, the electronic controller 24 determines that the steering angle is to the right when the left front wheel position and the right front wheel position are greater than positive 10 degrees. When the electronic controller 24 determines that the steering angle is to the right, the right rear wheel 12B of the host vehicle 2 is selected (at block 415).

Alternatively, when the electronic controller 24 determines that the steering angle is not to the right, the electronic controller 24 determines whether the steering angle is to the left (at block 420). In some embodiments, the electronic controller 24 compares the steering angle to a second threshold value. For example, when the steering angle is the position of the steering wheel 50, the electronic controller 24 determines that the steering angle is to the left when the steering wheel position is less than negative 180 degrees. As a further example, when the steering angle is the positions of the front wheels 12A and 12C, the electronic controller 24 determines that the steering angle is to the left when the left front wheel position and the right front wheel position are less than negative 10 degrees. When the electronic controller 24 determines that the steering angle is to the left, the left rear wheel 12D of the host vehicle 2 is selected (at block 425).

Alternatively, when the electronic controller 24 determines that the steering angle is not to the left (or to the right), the electronic controller 24 does not select a rear wheel, but rather determines that no single braking intervention should be applied (at block 430). When the steering angle is between the first threshold and the second threshold, the host vehicle 2 may be traveling in a straight direction (either forward or backward). In some embodiments, single side braking interventions are not applied when the host vehicle 2 is moving in a straight direction.

Figure 10:
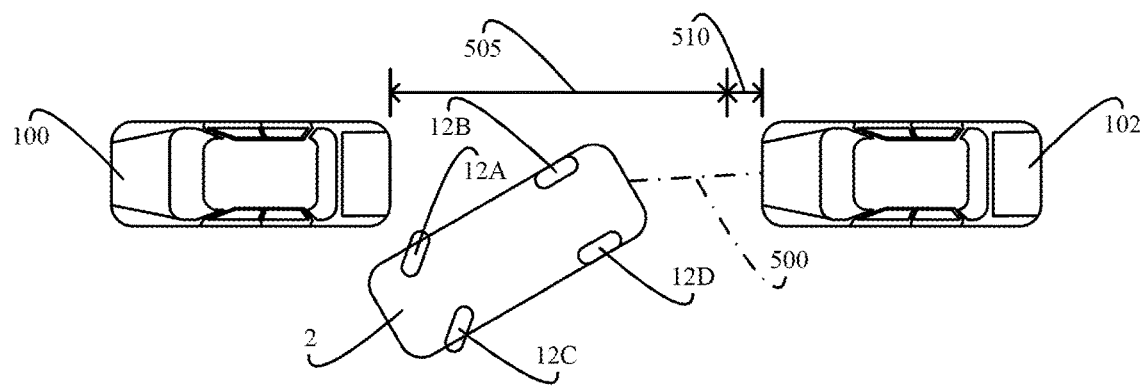
FIG. 10 is a diagram of a host vehicle performing a parallel parking maneuver.

In some embodiments, the electronic controller 24 determines whether to apply single side braking (i.e., braking to either the right rear wheel 12B or the left rear wheel 12D) or both side braking (i.e., braking to both the right rear wheel 12B and the left rear wheel 12D) based on the amount of available clearance behind the host vehicle 2. As illustrated in FIG. 10, the amount of available clearance behind the host vehicle 2 is based on a distance 500 between the rear side 6 of the host vehicle 2 and the second vehicle 102. This distance 500 decreases as the host vehicle 2 performs a parallel parking maneuver. Within a first range 505 of this distance 500, the amount of available clearance behind the host vehicle 2 is large enough to apply single side braking. With a second range 510, the host vehicle 2 is positioned close enough to the second vehicle 102 such that braking is applied to both sides of the host vehicle 2 in order to prevent a collision. Thus, in some embodiments, the electronic controller 24 determines the distance 500 between the rear side 6 of the host vehicle 2 and the second vehicle 102, and applies a braking force (for example, a third braking force) to the right rear wheel 12B and to the left rear wheel 12D when the distance 500 is less than a clearance threshold. When the distance is greater than or equal to the clearance threshold, the electronic controller 24 selectively applies single side braking as described herein. In some embodiments, the electronic controller 24 determines the distance 500 between the rear side 6 of the host vehicle 2 and the second vehicle 102 using sensors included in the plurality of sensors 26 (for example, radar sensors, LIDAR sensors, ultrasonic sensors, optical sensors, or a combination thereof).

Thus, various embodiments include, among other things, methods and systems for performing parallel parking maneuvers with single side braking. Various embodiments and features are set forth in the following claims.

What is claimed is:

1. A method of performing a parallel parking maneuver of a host vehicle between a first object and a second object, the method comprising:
   detecting a parking mode;
   determining a parking space size upon detecting the parking mode;
   selecting a left rear wheel of the host vehicle or a right rear wheel of the host vehicle;
   applying a first braking force to the selected rear wheel of the host vehicle when the parking space size is less than a size threshold, the first braking force sufficient to lock-up the selected rear wheel of the host vehicle; and
   applying a second braking force to the selected rear wheel of the host vehicle when the parking space size is greater than or equal to the size threshold, the second braking force is less than the first braking force,
   wherein detecting the parking mode includes receiving a signal from a driver selected button.

2. The method of claim 1, wherein selecting the left rear wheel of the host vehicle or the right rear wheel of the host vehicle includes
   determining a steering angle of the host vehicle,
   selecting the right rear wheel of the host vehicle when the steering angle is to the right, and
   selecting the left rear wheel of the host vehicle when the steering angle is to the left.

3. The method of claim 2, wherein the steering angle of the host vehicle is determined based at least in part on at least one selected from a group consisting of a steering wheel position, a left front wheel position, and a right front wheel position.

4. The method of claim 1, further comprising
   determining a distance between a rear side of the host vehicle and the second object;
   applying the first braking force or the second braking force to the selected rear wheel of the host vehicle when the distance is greater than or equal to a clearance threshold; and
   applying a third braking force to the right rear wheel of the host vehicle and to the left rear wheel of the host vehicle when the distance is less than the clearance threshold.

5. The method of claim 1, wherein determining the parking space size includes determining a distance between the first object and the second object.

6. A method of performing a parallel parking maneuver of a host vehicle between a first object and a second object, the method further comprising detecting a parking mode;
   determining a vehicle speed upon detecting the parking mode;
   selecting a left rear wheel of the host vehicle or a right rear wheel of the host vehicle;
   determining whether an area between the rear side of the host vehicle and the second object is clear;

applying a braking force to the selected rear wheel of the host vehicle when the vehicle speed is greater than a speed threshold and the area is clear; and applying the braking force to stop movement of the host vehicle when the area is obstructed.

7. The method of claim 6, wherein selecting the left rear wheel of the host vehicle or the right rear wheel of the host vehicle includes determining a steering angle of the host vehicle, selecting the right rear wheel of the host vehicle when the steering angle is to the right, and selecting the left rear wheel of the host vehicle when the steering angle is to the left.

8. The method of claim 7, wherein the steering angle of the host vehicle is determined based at least in part on at least one selected from a group consisting of a steering wheel position, a left front wheel position, and a right front wheel position.

9. The method of claim 6, further comprising determining a distance between a rear side of the host vehicle and the second object;

applying the braking force to the selected rear wheel of the host vehicle when the vehicle speed is greater than the speed threshold and the distance is greater than or equal to a clearance threshold; and applying the braking force to the right rear wheel of the host vehicle and to the left rear wheel of the host vehicle when the distance is less than the clearance threshold.

10. The method of claim 6, wherein applying the braking force to stop movement of the host vehicle includes applying the braking force to the right rear wheel of the host vehicle and to the left rear wheel of the host vehicle.

11. A method of performing a parallel parking maneuver of a host vehicle between a first object and a second object, the method comprising:

detecting a parking mode;

determining a vehicle speed upon detecting the parking mode;

selecting a left rear wheel of the host vehicle or a right rear wheel of the host vehicle;

determining whether an area adjacent to the left side of the host vehicle is clear;

applying a braking force to the selected rear wheel of the host vehicle when the vehicle speed is greater than the speed threshold and a area is clear; and applying the braking force to stop movement of the host vehicle when the area is obstructed.

12. The method of claim 11, wherein selecting the left rear wheel of the host vehicle or the right rear wheel of the host vehicle includes determining a steering angle of the host vehicle, selecting the right rear wheel of the host vehicle when the steering angle is to the right, and selecting the left rear wheel of the host vehicle when the steering angle is to the left.

13. A method of performing a parallel parking maneuver of a host vehicle between a first object and a second object, the method comprising:

detecting a parking mode;

determining a vehicle speed upon detecting the parking mode;

selecting a left rear wheel of the host vehicle or a right rear wheel of the host vehicle; and applying a braking force to the selected rear wheel of the host vehicle when the vehicle speed is greater than a speed threshold, wherein detecting the parking mode includes receiving a signal from a driver selected button.

14. The method of claim 13, wherein selecting the left rear wheel of the host vehicle or the right rear wheel of the host vehicle includes determining a steering angle of the host vehicle, selecting the right rear wheel of the host vehicle when the steering angle is to the right, and selecting the left rear wheel of the host vehicle when the steering angle is to the left.

15. A system for performing a parallel parking maneuver of a host vehicle between a first object and a second object, the system comprising:

a powertrain;

a braking system;

a steering system; and an electronic controller electrically coupled to the powertrain, the braking system, and the steering system, the electronic controller configured to detect a parking mode, determine a parking space size upon detecting the parking mode, select a left rear wheel of the host vehicle or a right rear wheel of the host vehicle, apply, via the braking system, spin-by-lockup-wheel to the selected rear wheel when the parking space size is less than a size threshold, and apply, via the braking system, steer-by-brake to the selected rear wheel when the parking space size is greater than or equal to the size threshold, wherein the electronic controller is further configured to detect the parking mode based on a signal received from a driver selected button.

16. The system of claim 15, wherein the electronic controller is further configured to determine a steering angle of the host vehicle, select the right rear wheel of the host vehicle when the steering angle is to the right, and select the left rear wheel of the host vehicle when the steering angle is to the left.

17. The system of claim 16, wherein the electronic controller is further configured to determine the steering angle of the host vehicle based at least in part on at least one selected from a group consisting of a steering wheel position, a left front wheel position, and a right front wheel position.

18. The system of claim 15, wherein the electronic controller is further configured to determine a distance between a rear side of the host vehicle and the second object, apply, via the braking system, the spin-by-lockup-wheel or the steer-by-brake to the selected rear wheel of the host vehicle when the distance is greater than or equal to a clearance threshold; and apply, via the braking system, a braking force to the right rear wheel of the host vehicle and to the left rear wheel of the host vehicle when the distance is less than the clearance threshold.

19. The system of claim 15, wherein the electronic controller is further configured to determine a distance between the first object and the second object, and determine the parking space size based on the distance between the first object and the second object.

* * * * *